United States Patent
Zhang et al.

(10) Patent No.: US 11,176,028 B2
(45) Date of Patent: Nov. 16, 2021

(54) SYSTEM, METHOD AND STORAGE DEVICE FOR CIM/E MODEL STANDARD COMPLIANCE TEST

(71) Applicants: CHINA ELECTRIC POWER RESEARCH INSTITUTE COMPANY LIMITED, Beijing (CN); STATE GRID CORPORATION OF CHINA, Beijing (CN)

(72) Inventors: Linpeng Zhang, Beijing (CN); Yujia Li, Beijing (CN); Qingbo Yang, Beijing (CN); Lixin Li, Beijing (CN); Fangchun Di, Beijing (CN); Yunhao Huang, Beijing (CN); Dapeng Li, Beijing (CN); Lei Tao, Beijing (CN); Yangchun Hao, Beijing (CN); Zhenyu Chen, Beijing (CN)

(73) Assignees: CHINA ELECTRIC POWER RESEARCH INSTITUTE COMPANY LIMITED, Beijing (CN); STATE GRID CORPORATION OF CHINA, Beijing (CN)

( * ) Notice: Subject to any disclaimer, the term of this patent is extended or adjusted under 35 U.S.C. 154(b) by 535 days.

(21) Appl. No.: 15/769,768

(22) PCT Filed: Jul. 4, 2016

(86) PCT No.: PCT/CN2016/088433
§ 371 (c)(1),
(2) Date: Apr. 20, 2018

(87) PCT Pub. No.: WO2017/067225
PCT Pub. Date: Apr. 27, 2017

(65) Prior Publication Data
US 2018/0307594 A1    Oct. 25, 2018

(30) Foreign Application Priority Data

Oct. 20, 2015  (CN) .......................... 201510685311.0

(51) Int. Cl.
*G06F 11/36* (2006.01)
*G06F 16/28* (2019.01)
(Continued)

(52) U.S. Cl.
CPC ...... *G06F 11/3692* (2013.01); *G06F 11/3664* (2013.01); *G06F 11/3684* (2013.01);
(Continued)

(58) Field of Classification Search
CPC .. G06F 11/3692; G06F 16/28; G06F 11/3664; G06F 11/3684; G06F 11/3688; G06F 2119/06; G06Q 50/06
See application file for complete search history.

(56) References Cited

U.S. PATENT DOCUMENTS 6,516,326 B1 * 2/2003 Goodrich .............. G06F 16/256
707/602
7,930,159 B1 * 4/2011 Florissi ................... G06F 30/20
703/13
(Continued)

FOREIGN PATENT DOCUMENTS

| CN | 101436277 A | 5/2009 |
|----|-------------|--------|
| CN | 101807267 A | 8/2010 |

(Continued)

OTHER PUBLICATIONS

Wang X, Schulz NN, Neumann S. CIM extensions to electrical distribution and CIM XML for the IEEE radial test feeders. IEEE transactions on Power Systems. Jul. 28, 2003;18(3):1021-8. (Year: 2003).*

(Continued)

*Primary Examiner* — Chuen-Meei Gan
(74) *Attorney, Agent, or Firm* — Syncoda LLC; Feng Ma

(57) ABSTRACT

A standard conformance testing system and method for a CIM/E model of a power system and a storage medium include: converting the standards "Power Grid Common
(Continued)

Model Description Specification (GB/T 30149)" and "Power Grid Operating Model Data Exchange Specification (DL/T 1380)" into practically operable testing rules, and performing automatic generation and verification of a CIM/E standard model and defect model. The testing system and method can improve the comprehensiveness and standardization of a CIM/E model standard compliance test, improving testing efficiency, promoting the level of standardization according to the CIM/E model in a power system software development process, and real time data exchange and interoperation between respective application systems, effectively supporting the safe and stable operation of a power grid.

10 Claims, 4 Drawing Sheets

(51) Int. Cl.
  *G06Q 50/06* (2012.01)
  *G06F 119/06* (2020.01)
(52) U.S. Cl.
  CPC .......... *G06F 11/3688* (2013.01); *G06F 16/28* (2019.01); *G06Q 50/06* (2013.01); *G06F 2119/06* (2020.01)

(56) References Cited

U.S. PATENT DOCUMENTS

| | | | | |
|---|---|---|---|---|
| 2007/0185591 | A1* | 8/2007 | Frei | G06F 16/88 700/22 |
| 2011/0010016 | A1* | 1/2011 | Giroti | G06Q 50/06 700/291 |
| 2013/0073274 | A1* | 3/2013 | Mucklow | F03B 17/063 703/14 |
| 2014/0149369 | A1* | 5/2014 | Fan | G06F 30/00 707/695 |
| 2015/0261647 | A1 | 9/2015 | Sakaki | |
| 2016/0344189 | A1* | 11/2016 | Ozaki | H02J 7/007 |

FOREIGN PATENT DOCUMENTS

| | | |
|---|---|---|
| CN | 101930481 A | 12/2010 |
| CN | 102184209 A | 9/2011 |
| CN | 102663094 A | 9/2012 |
| CN | 102750358 A | 10/2012 |
| CN | 102799620 A | 11/2012 |
| CN | 102928689 A | 2/2013 |
| CN | 103164760 A | 6/2013 |
| CN | 103208087 A | 7/2013 |
| CN | 103353871 A | 10/2013 |
| CN | 103729496 A | 4/2014 |
| CN | 103902451 A | 7/2014 |
| CN | 104112183 A | 10/2014 |
| CN | 104134163 A | 11/2014 |
| CN | 104134173 A | 11/2014 |
| CN | 104392398 A | 3/2015 |
| CN | 104881822 A | 9/2015 |
| CN | 105426300 A | 3/2016 |
| KR | 100964296 B1 | 6/2010 |
| WO | 2015062277 A1 | 5/2015 |

OTHER PUBLICATIONS

Goodrich, M. E. "Role of interoperability tests in standardizing CIM." In 2009 IEEE Power & Energy Society General Meeting, pp. 1-4. IEEE, 2009. (Year: 2009).*
International Search Report in international application No. PCT/CN2016/088433, dated Sep. 12, 2016.
English Translation of the Written Opinion of the International Search Authority in international application No. PCT/CN2016/088433, dated Sep. 12, 2016.
Specification for exchanging of grid operating model data, issued on Oct. 15, 2014.
Grid common model description specification, issued on Dec. 17, 2013.
Notice of Allowance of the Chinese application No. 201510685311.0, dated Nov. 12, 2020.
"Smart Grid" vol. 3 Issue 2, Li Yujia, "Interpretation of General Software Testing Specification for Power Dispatching Automation System", mailed on Feb. 10, 2015.
"Radio and Television Information" Issue 278, Fu Guangtao, "NGB TVOS Standard Conformance Test Toolset Design and Development", mailed on Jun. 15, 2015.

* cited by examiner

SYSTEM, METHOD AND STORAGE DEVICE FOR CIM/E MODEL STANDARD COMPLIANCE TEST

TECHNICAL FIELD

The disclosure relates to a power scheduling automation system, and particularly to a standard conformance testing system and method for a Common Information Model/E (CIM/E) model of a power system and a storage medium.

BACKGROUND

Construction of a smart grid and a large operation system requires an efficient and accurate integrated modeling technology, and an efficient model information exchange standard is a guarantee of this technology. CIM/E and its related technology have been applied to smart grid scheduling technology supporting systems to solve problems about online model exchange between each application of a power system. For improving a standardization degree and practicability of the CIM/E, comprehensive and normative standard conformance tests are required.

At present, an existing Common Information Model (CIM) standard conformance test is for Common Information Model (CIM)/Extensible Markup Language (CIM/XML), there is no standard conformance test for a CIM/E, and moreover, the problems of more human intervention, difficulties of natural language description of a standard in comprehensive quantification of tested function points, relatively greater subjective influence of a detector on a detection result and the like exist in detection work.

By applying a standard conformance testing method for a CIM/E model of a power system, comprehensive and normative testing rule making and setting, automatic generation and checking of standard and defect model files and CIM/E model import and checking testing, CIM/E model generation and import testing and CIM/E model export and import testing over a tested software system applied to the power system may be implemented according to a language description specification of a standard.

SUMMARY

For filling this gap, embodiments of the disclosure provide a standard conformance testing system and method for a CIM/E model of a power system and a storage medium, which may automatically generate and check a CIM/E standard model and a defect model and implement CIM/E model import and checking testing, CIM/E model generation and export testing and CIM/E model export and import testing over tested system software of the power system.

In order to achieve the purpose, the embodiments of the disclosure are implemented by the following technical solutions.

A first aspect of the embodiments of the disclosure provides a standard conformance testing system for a CIM/E model of a power system, the system including:

a human-computer interaction module, configured for a tester to participate in system testing, including setting of testing rules and parameters, observation of a feedback result of the tested system and input of a testing result;

a testing rule set, configured to store testing rules written according to the standard "Grid Common Model Description Specification (GB/T 30149)" and the standard "Specification for Exchanging of Grid Operating Model Data (DL/T 1380)";

a model generation module, configured to generate a CIM/E standard model and a defect model according to the testing rules;

a model checking module, configured to perform automatic checking of standard conformance of the CIM/E model according to the testing rules and perform automatic comparison of model content information, the automatic checking comprising checking whether a file format and a service function are conformant to the standards; and a storage module, configured to store the testing result.

In the solution, the testing rule set communicates with the human-computer interaction module to implement testing rule selection and testing parameter setting for different tested systems.

In the solution, the testing rule set includes a reference rule subset configured to store testing rules for application characteristics and testing requirements of different tested systems, which are selected from the testing rule set.

In the solution, the model generation module includes a first generation unit and a second generation unit, wherein the first generation unit is configured to automatically generate the CIM/E standard model; and the second generation unit is configured to automatically generate the defect model.

In the solution, the CIM/E standard model is a model conformant to format and content information requirements specified in the standard "Grid Common Model Description Specification (GB/T 30149)" and the standard "Specification for Exchanging of Grid Operating Model Data (DL/T 1380)", and includes a standard full model and a standard incremental model.

In the solution, the model checking module includes a first checking unit, a second checking unit and a third checking unit, wherein the first checking unit is configured for file format checking;

the second checking unit is configured for service function checking; and the third checking unit is configured for model content checking.

In the solution, defects include a structural defect, a type defect, an attribute defect and an association defect.

A second aspect of the embodiments of the disclosure provides a standard conformance testing method for export and import of a CIM/E model of a power system, which specifically includes the following steps:

(1) testing rules are selected according to an application characteristic and testing requirement of the tested system;

(2) a corresponding CIM/E standard model is automatically generated, including a to-be-tested model required to be processed by the tested system and an expected result model after processing by the tested system, and the to-be-tested model is exported to the tested system;

(3) whether the tested system successfully inputs the CIM/E standard model is manually observed, the next step is entered in case of successful input, otherwise a result indicating a testing failure is output;

(4) the tested system processes the input model, and outputs the CIM/E model to a specified path through an Input/Output (I/O) interface;

(5) a standard conformance determination rule is acquired, a file format and service function of the model are checked on an item-by-item basis, and whether the CIM/E model output by the tested system and the generated expected result model have consistent content information is checked, the content information including attribute information and data information of a model table; and (6) testing result information about all tested function items after checking is automatically output and stored.

In the solution, the CIM/E standard model is a model conformant to format and content information requirements specified in the standard "Grid Common Model Description Specification (GB/T 30149)" and the standard "Specification for Exchanging of Grid Operating Model Data (DL/T 1380)", and includes a standard full model and a standard incremental model.

A third aspect of the embodiments of the disclosure provides a standard conformance testing method for export of a CIM/E model of a power system, the method including that:

testing rules required by generation of CIM/E standard model and defect model files are selected according to a characteristic and testing requirement of the tested system;

a set of to-be-tested models are automatically generated as tested function items according to the testing rules, wherein the models include a CIM/E standard model and a defect model;

the to-be-tested models are automatically exported, and are sent to a specified path of the tested system through an I/O interface; and feedback information of the tested system for each to-be-tested model is observed to determine whether testing succeeds, and testing result information is recorded and automatically stored.

In the solution, a basis indicating that testing succeeds includes that: if the tested system can normally import and parse the CIM/E standard model and recognize the defect model, it is determined that standard conformance testing succeeds, otherwise, it is determined that testing fails.

In the solution, the testing result information includes whether the tested function items pass testing, chapter position information of the standard "Grid Common Model Description Specification (GB/T 30149)" and the standard "Specification for Exchanging of Grid Operating Model Data (DL/T 1380)", and types of defects to which tested items not passing testing belong, the defects including a structural defect, a type defect, an attribute defect and an association defect.

A fourth aspect of the embodiments of the disclosure provides a standard conformance testing method for import of a CIM/E model of a power system, the method including the following steps:

the tested system outputs a to-be-tested CIM/E model to a specified path of a testing system through an I/O interface;

the testing system imports and parses the to-be-tested CIM/E model from the tested system;

testing rules corresponding to a file format and service function of the model are automatically acquired from a testing rule set, and all tested function items of four defect types are checked on an item-by-item basis, wherein the testing rule set is configured to store testing rules written according to the standard "Grid Common Model Description Specification (GB/T 30149)" and the standard "Specification for Exchanging of Grid Operating Model Data (DL/T 1380)"; and testing result information is automatically output and stored.

The standard conformance testing system and method for the CIM/E model of the power system and storage medium of the embodiments of the disclosure may implement conversion of the standard "Grid Common Model Description Specification (GB/T 30149)" and the standard "Specification for Exchanging of Grid Operating Model Data (DL/T 1380)" into practically operable testing rules and provide an automatic generation and checking method for the CIM/E standard model and the defect model, and may perform CIM/E model import and checking testing, CIM/E model generation and export testing and CIM/E model export and import closed-loop testing over tested system software of the power system by making and setting the testing rules. The method may greatly reduce the problems of more manual testing intervention, high workload, high subjectivity, low testing efficiency and the like and comprehensively improve a normalization and automation degree of testing.

The automatic testing method may improve comprehensiveness and normalization of standard conformance testing of the CIM/E model, improve detection efficiency, promote a standardization degree of the CIM/E model in a software development process of the power system and real-time data exchange and interoperation between each application system and effectively support safe and stable operation of a power grid.

DETAILED DESCRIPTION

Specific implementation modes of the disclosure will be further described below in combination with the drawings in detail.

A standard conformance testing system for a CIM/E model of a power system is provided.

The power system: an electric energy production and consumption system formed by power stations, power transmission and transformation lines, power supply and distribution stations and links of electricity consumption and the like.

CIM/E: an E document of a common model of the power system is constructed by taking a CIM Resource Description Framework (RDF) mode as a meta model framework. CIM/E is an efficient power system model description and exchange format developed for an efficiency defect of a CIM/XML format and is applied to online exchange of the common model of the power system. The CIM/XML format and the CIM/E format may be mutually converted.

CIM/XML: an XML document of the common model of the power system is constructed by taking the CIM RDF mode as the meta model framework. A style of the document is called as a CIM/XML format, configured to describe and exchange the common model of the power system.

Figure 2:
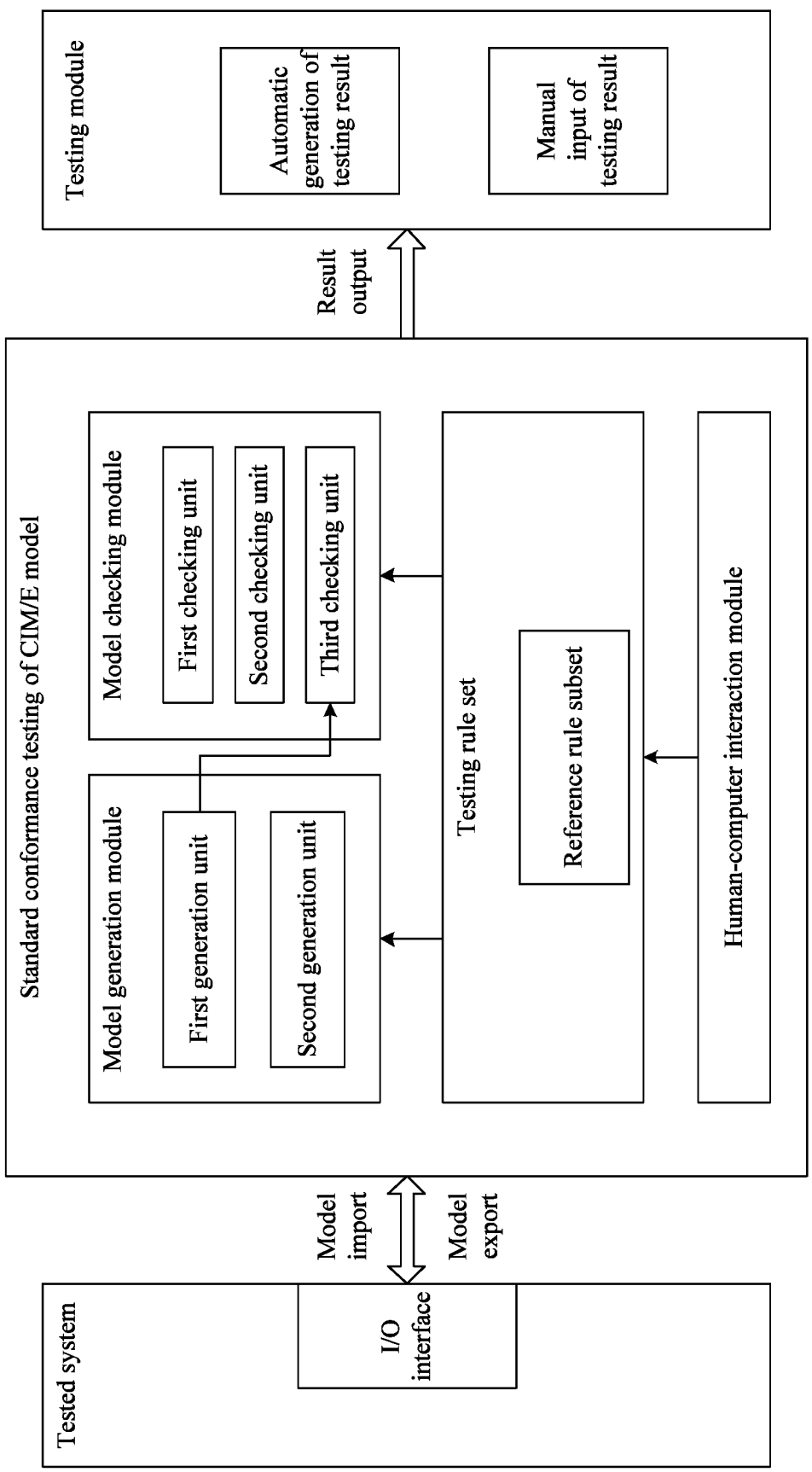
FIG. 2 is a structure diagram of a standard conformance testing system for a CIM/E model of a power system.

As shown in FIG. 2, the system includes:

a human-computer interaction module, configured for a tester to participate in system testing, including setting of testing rules and parameters, observation of a feedback result of the tested system and input of a testing result;

a testing rule set, configured to store testing rules written according to the standard "Grid Common Model Description Specification (GB/T 30149)" and the standard "Specification for Exchanging of Grid Operating Model Data (DL/T 1380)";

a model generation module, configured to generate a CIM/E standard model and a defect model according to the testing rules;

a model checking module, configured to perform automatic checking of standard conformance of the CIM/E model according to the testing rules and perform automatic comparison of model content information, the automatic checking comprising checking whether a file format and a service function are conformant to the standards; and a storage module, configured to store the testing result.

The testing rule set communicates with the human-computer interaction module to implement testing rule selection and testing parameter setting for different tested systems.

The testing rule set includes a reference rule subset configured to store testing rules for application characteristics and testing requirements of different tested systems, which are selected from the testing rule set.

The model generation module includes a first generation unit and a second generation unit, wherein the first generation unit is configured to automatically generate the CIM/E standard model; and the second generation unit is configured to automatically generate the defect model.

The CIM/E standard model is a model conformant to format and content information requirements specified in the standard "Grid Common Model Description Specification (GB/T 30149)" and the standard "Specification for Exchanging of Grid Operating Model Data (DL/T 1380)", and includes a standard full model and a standard incremental model.

The model checking module includes a first checking unit, a second checking unit and a third checking unit, wherein the first checking unit is configured for file format checking;

the second checking unit is configured for service function checking; and the third checking unit is configured for model content checking.

Defects include a structural defect, a type defect, an attribute defect and an association defect.

During a practical application, the human-computer interaction module, the model generation module and the model checking module may all be implemented by a Central Processing Unit (CPU), or a Digital Signal Processor (DSP), a Field Programmable Gate Array (FPGA) or the like; and the testing rule set and the storage module may both be implemented by a memory.

Figure 1:
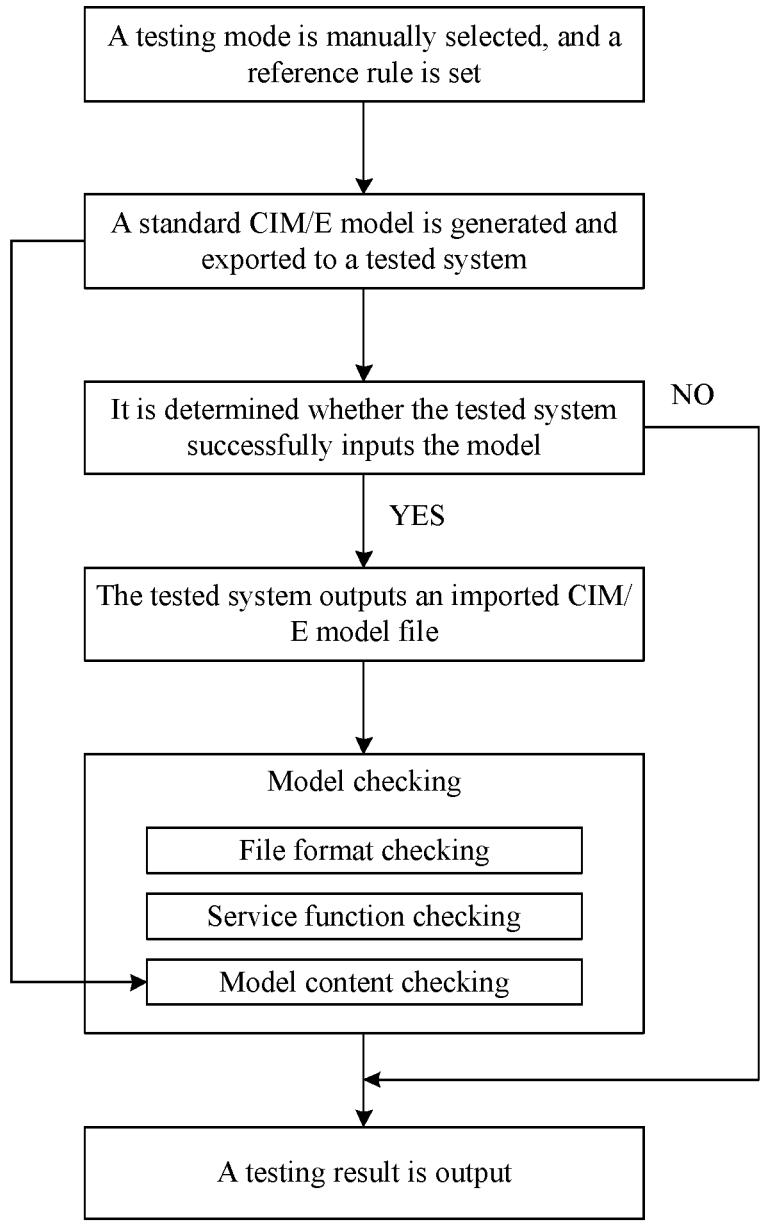
FIG. 1 is a flowchart of a standard conformance testing method for export and import of a CIM/E model.

As shown in FIG. 1, a standard conformance testing method for export and import of a CIM/E model of a power system specifically includes the following steps.

In (1), testing rules are selected according to an application characteristic and testing requirement of the tested system.

In (2), a corresponding CIM/E standard model is automatically generated, including a to-be-tested model required to be processed by the tested system and an expected result model after processing by the tested system, and the to-be-tested model is exported to the tested system.

In (3), whether the tested system successfully inputs the CIM/E standard model is manually observed, the next step is entered in case of successful input, otherwise a result indicating a testing failure is output.

In (4), the tested system processes the input model, and outputs the CIM/E model to a specified path through an I/O interface.

In (5), a standard conformance determination rule is acquired, a file format and service function of the model are checked on an item-by-item basis, and whether the CIM/E model output by the tested system and the generated expected result model have consistent content information is checked, the content information including attribute information and data information of a model table.

In (6), testing result information about all tested function items after checking is automatically output and stored.

The CIM/E standard model is a model conformant to format and content information requirements specified in the standard "Grid Common Model Description Specification (GB/T 30149)" and the standard "Specification for Exchanging of Grid Operating Model Data (DL/T 1380)", and includes a standard full model and a standard incremental model.

An embodiment of the disclosure further discloses a first computer-readable storage medium, which includes a set of instructions configured to execute the abovementioned standard conformance testing method for export and import of the CIM/E model of the power system.

Figure 4:
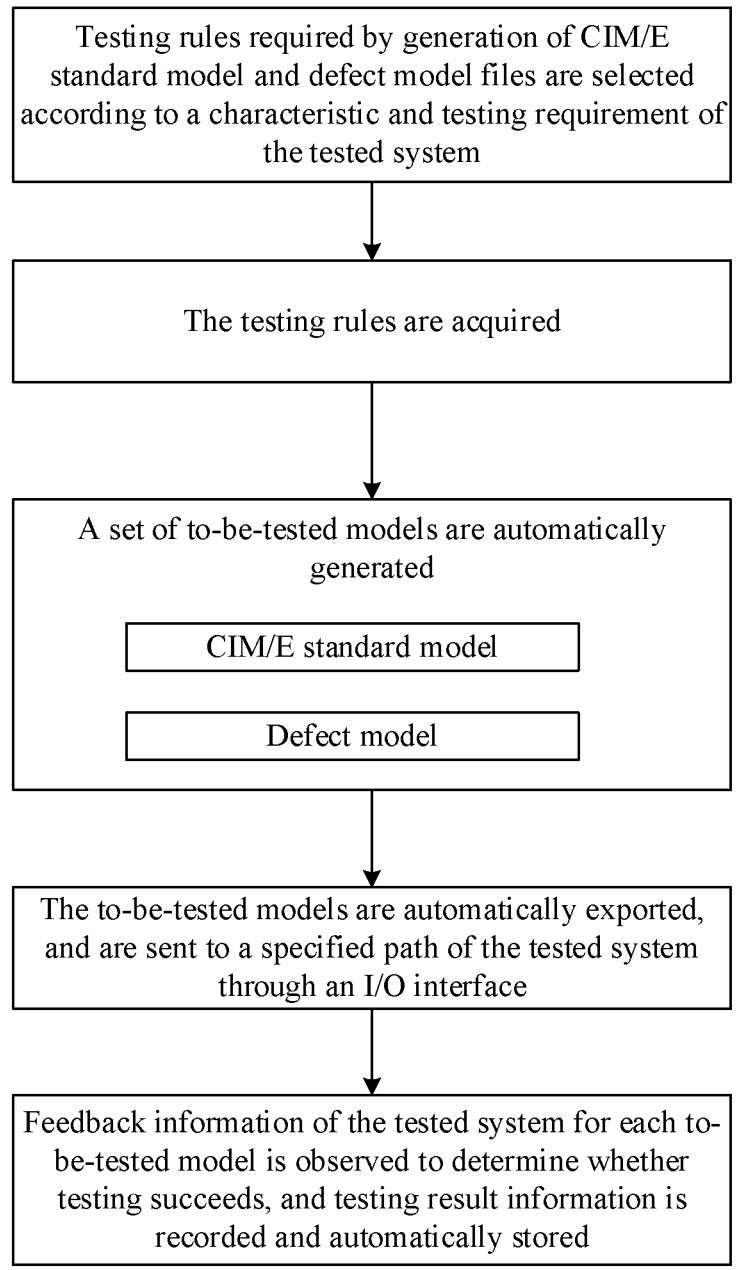
FIG. 4 is a flowchart of a standard conformance testing method for export of a CIM/E model.

FIG. 4 shows a standard conformance testing method for export of a CIM/E model of a power system, and the method includes the following steps:

testing rules required by generation of CIM/E standard model and defect model files are selected according to a characteristic and testing requirement of the tested system;

a set of to-be-tested models are automatically generated as tested function items according to the testing rules, wherein the models include a CIM/E standard model and a defect model;

the to-be-tested models are automatically exported, and are sent to a specified path of the tested system through an I/O interface; and feedback information of the tested system for each to-be-tested model is observed to determine whether testing succeeds, and testing result information is recorded and automatically stored.

A basis indicating that testing succeeds includes that: if the tested system can normally import and parse the CIM/E standard model and recognize the defect model, it is determined that standard conformance testing succeeds, otherwise, it is determined that testing fails.

The testing result information includes whether the tested function items pass testing, chapter position information of the standard "Grid Common Model Description Specification (GB/T 30149)" and the standard "Specification for Exchanging of Grid Operating Model Data (DL/T 1380)", and types of defects to which tested items not passing testing belong, the defects including a structural defect, a type defect, an attribute defect and an association defect.

An embodiment of the disclosure further discloses a second computer-readable storage medium, which includes a set of instructions configured to execute the abovementioned standard conformance testing method for export of the CIM/E model of the power system.

Figure 3:
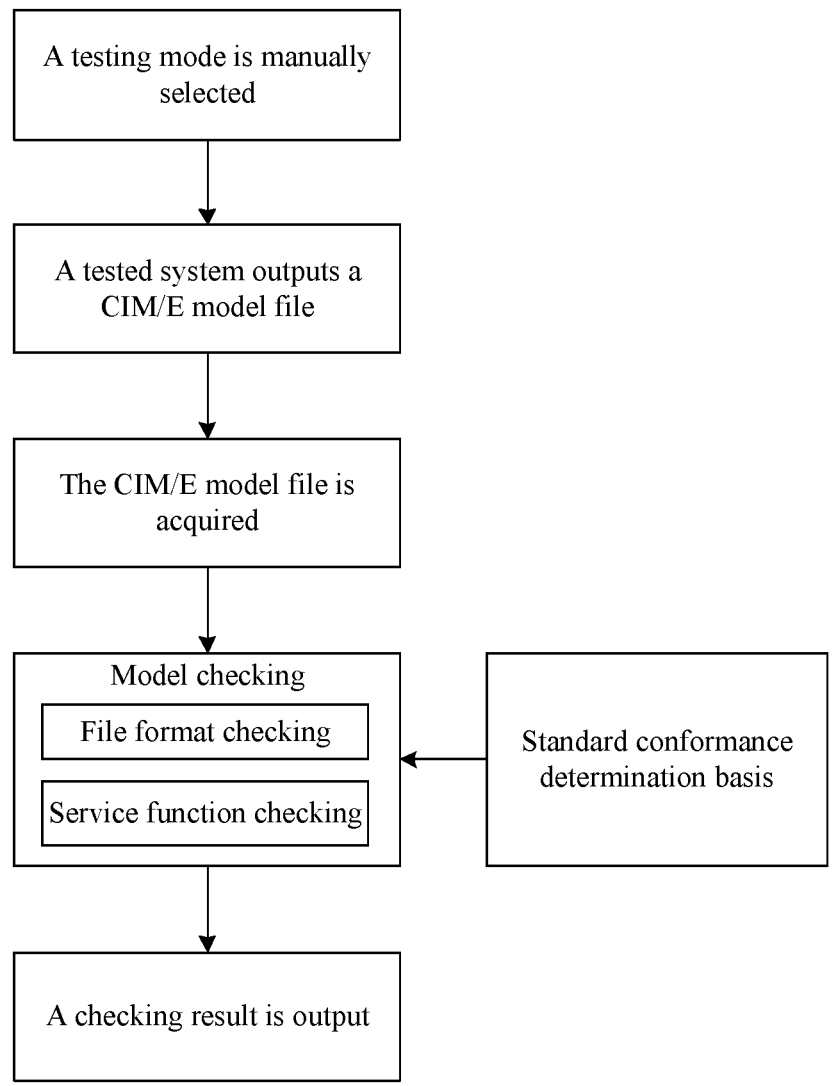
FIG. 3 is a flowchart of a standard conformance testing method for import of a CIM/E model.

FIG. 3 shows a standard conformance testing method for import of a CIM/E model of a power system, and the method includes the following steps:

the tested system outputs a to-be-tested CIM/E model to a specified path of a testing system through an I/O interface;

the testing system imports and parses the to-be-tested CIM/E model from the tested system;

testing rules corresponding to a file format and service function of the model are automatically acquired from a testing rule set, and all tested function items of four defect types are checked on an item-by-item basis, wherein the testing rule set is configured to store testing rules written according to the standard "Grid Common Model Description Specification (GB/T 30149)" and the standard "Specification for Exchanging of Grid Operating Model Data (DL/T 1380)"; and testing result information is automatically output and stored.

An embodiment of the disclosure further discloses a third computer-readable storage medium, which includes a set of instructions configured to execute the abovementioned standard conformance testing method for import of the CIM/E model of the power system.

It should finally be noted that: the above embodiments are adopted to not limit but only describe the technical solutions of the disclosure, those skilled in the art should may still make modifications or equivalent replacements to the specific implementation modes of the disclosure, and any modifications or equivalent replacements made without departing from the spirit and scope of the disclosure shall fall within the scope of protection of the claims of the disclosure applying for approval.

INDUSTRIAL APPLICABILITY

According to the embodiments of the disclosure, conversion of the standard "Grid Common Model Description Specification (GB/T 30149)" and the standard "Specification for Exchanging of Grid Operating Model Data (DL/T 1380)" into practically operable testing rules may be implemented, an automatic generation and checking method for the CIM/E standard model and the defect model is provided, and CIM/E model import and checking testing, CIM/E model generation and export testing and CIM/E model export and import closed-loop testing over tested system software of the power system may be performed by making and setting the testing rules. The method may greatly reduce the problems of more manual testing intervention, high workload, high subjectivity, low testing efficiency and the like and comprehensively improve a normalization and automation degree of testing.

The invention claimed is:

1. A standard conformance testing system for a Common Information Model/E (CIM/E) model of a power system, comprising:
a processor, configured for a tester to participate in the power system testing, comprising setting of testing rules and parameters, observation of a feedback result of a tested system and input of a testing result;
memory, configured to store testing rules written according to CIM/E standards;
wherein the processor is further configured to: generate the CIM/E model and a defect model according to the testing rules, wherein the CIM/E model and the defect model are independent from each other; and
perform automatic checking of standard conformance of the CIM/E model an item-by-item basis according to the testing rules and perform automatic comparison of the CIM/E model content information, the automatic checking comprising checking whether a file format and a service function are conformant to the CIM/E standards to improve comprehensiveness and normalization of standard conformance testing of the CIM/E model, improve detection efficiency, promote a standardization degree of the CIM/E model in a software development process of the power system and real-time data exchange and interoperation between each application system and effectively support safe and stable operation of a power grid, wherein the CIM/E model content information comprises attribute information and data information of a model tables of both the CIM/E model output by the tested power system and an expected result model; and
wherein the processor is further configured to store the testing result information, wherein the testing result information comprises export and import function standard compliance testing results, export standard compliance testing results and import standard compliance testing results,
wherein the export and import function standard compliance testing results comprise whether the tested system has successfully performed an import function, whether the tested system has successfully performed an export function, and a checking result indicating at least one of following facts: the file format is not conformant to the CIM/E standards, the service function is not conformant to the standards CIM/E or the CIM/E model output by the tested power system and the expected result model have inconsistent content information;
the export standard compliance testing results comprise whether the tested function items pass the testing, chapter position information in the CIM/E standards corresponding to the tested function items not passing the testing and types of defects to which tested items not passing the testing belong; wherein the types of defects comprise a structural defect, a type defect, an attribute defect and an association defect and
the import standard compliance testing results comprise whether the tested function items pass testing, and a checking result indicating at least one of following facts: the file format is not conformant to the CIM/E standards, or the service function is not conformant to the CIM/E standards.

2. The system according to claim 1, wherein the memory communicates with the processor to implement testing rule selection and testing parameter setting for different tested power systems.

3. The system according to claim 2, wherein the memory comprises a sub-memory configured to store testing rules for application characteristics and testing requirements of different tested power systems, which are selected from the memory.

4. The system according to claim 1, wherein the processor comprises a first sub-processor and a second sub-processor,
wherein the first sub-processor is configured to automatically generate the CIM/E model; and
the second sub-processor is configured to automatically generate the defect model.

5. The system according to claim 1, wherein the CIM/E model is a model conformant to format and content information requirements specified in the CIM/E standards and comprises a standard full model and a standard incremental model.

6. The system according to claim 1, wherein the processor comprises a third sub-processor, a second checking unit fourth sub-processor and a fifth sub-processor,
wherein the third sub-processor first checking unit is configured for file format checking;
the fourth sub-processor second checking unit is configured for service function checking; and
the fifth sub-processor is configured for the CIM/E model content checking.

7. A computer-implemented standard conformance testing method for export and import of a Common Information Model/E (CIM/E) model of a power system, comprising:

(1) selecting testing rules according to an application characteristic and testing requirement of a tested power system;

(2) automatically generating a corresponding CIM/E model, comprising a to-be-tested model required to be processed by the tested power system and an expected result model after processing by the tested power system, and exporting the to-be-tested model to the tested power system, wherein the to-be-tested model and the expected result model are independent from each other;

(3) manually observing whether the tested power system has successfully imported the CIM/E model, entering the next step in case of successful import and responsive to that the tested power system has not successfully imported the CIM/E model, outputting a result indicating a testing failure;

(4) processing, by the tested power system, the input model, and outputting the CIM/E model to a specified path through an Input/Output (I/O) interface;

(5) acquiring a standard conformance determination rule, checking a file format and service function of the CIM/E model output by the tested power system on an item-by-item basis for types of defects and checking whether the CIM/E model output by the tested power system and the generated expected result model have consistent content information to improve comprehensiveness and normalization of standard conformance testing of the CIM/E model, improve detection efficiency, promote a standardization degree of the CIM/E model in a software development process of the power system and real-time data exchange and interoperation between each application system and effectively support safe and stable operation of a power grid, the content information comprising attribute information and data information of model tables of both the CIM/E model output by the tested power system and the expected result model; wherein the types of defects comprise a structural defect, a type defect, an attribute defect and an association defect and (6) automatically outputting and storing testing result information about all tested function items after checking, and types of defects to which tested function items not passing the testing belong; wherein the testing result information comprises whether the tested power system has successfully performed an import function, whether the tested power system has successfully performed an export function, and a checking result indicating at least one of following facts: the file format is not conformant to CIM/E standards, the service function is not conformant to the CIM/E standards or the CIM/E model output by the tested power system and the expected result model have inconsistent content information.

8. The method according to claim 7, wherein the CIM/E model is a model conformant to format and content information requirements specified in the CIM/E standards and comprises a standard full model and a standard incremental model.

9. A computer-implemented standard conformance testing method for export of a Common Information Model/E (CIM/E) model of a power system, comprising:

selecting testing rules required by generation of CIM/E model and defect model files according to a characteristic and testing requirement of a tested power system;

automatically generating a set of to-be-tested models as tested function items according to the testing rules, wherein the set of to-be-tested models comprise the CIM/E model and a defect model, wherein the CIM/E model and the defect model are independent from each other;

automatically exporting and sending the to-be-tested models to a specified path of the tested system through an Input/Output (I/O) interface; and observing feedback information of the tested power system for each to-be-tested model to determine whether testing succeeds on an item-by-item basis, and recording and automatically storing testing result information to improve comprehensiveness and normalization of standard conformance testing of the CIM/E model, improve detection efficiency, promote a standardization degree of the CIM/E model in a software development process of the power system and real-time data exchange and interoperation between each application system and effectively support safe and stable operation of a power grid, wherein the testing result information comprises whether the tested function items pass the testing, chapter position information in CIM/E standards corresponding to the tested function items not passing the testing and types of defects to which tested items not passing the testing belong; wherein the types of defects comprise a structural defect, a type defect, an attribute defect and an association defect.

10. The method according to claim 9, wherein a basis indicating that testing succeeds comprises: if the tested power system can normally import and parse the CIM/E model and recognize the defect model, it is determined that standard conformance testing succeeds, otherwise, it is determined that testing fails.

* * * * *